Oct. 24, 1939. W. E. SMITH 2,177,007
RELEASABLE SINKER HAVING WEIGHT CHANGING MEANS
Filed July 8, 1938
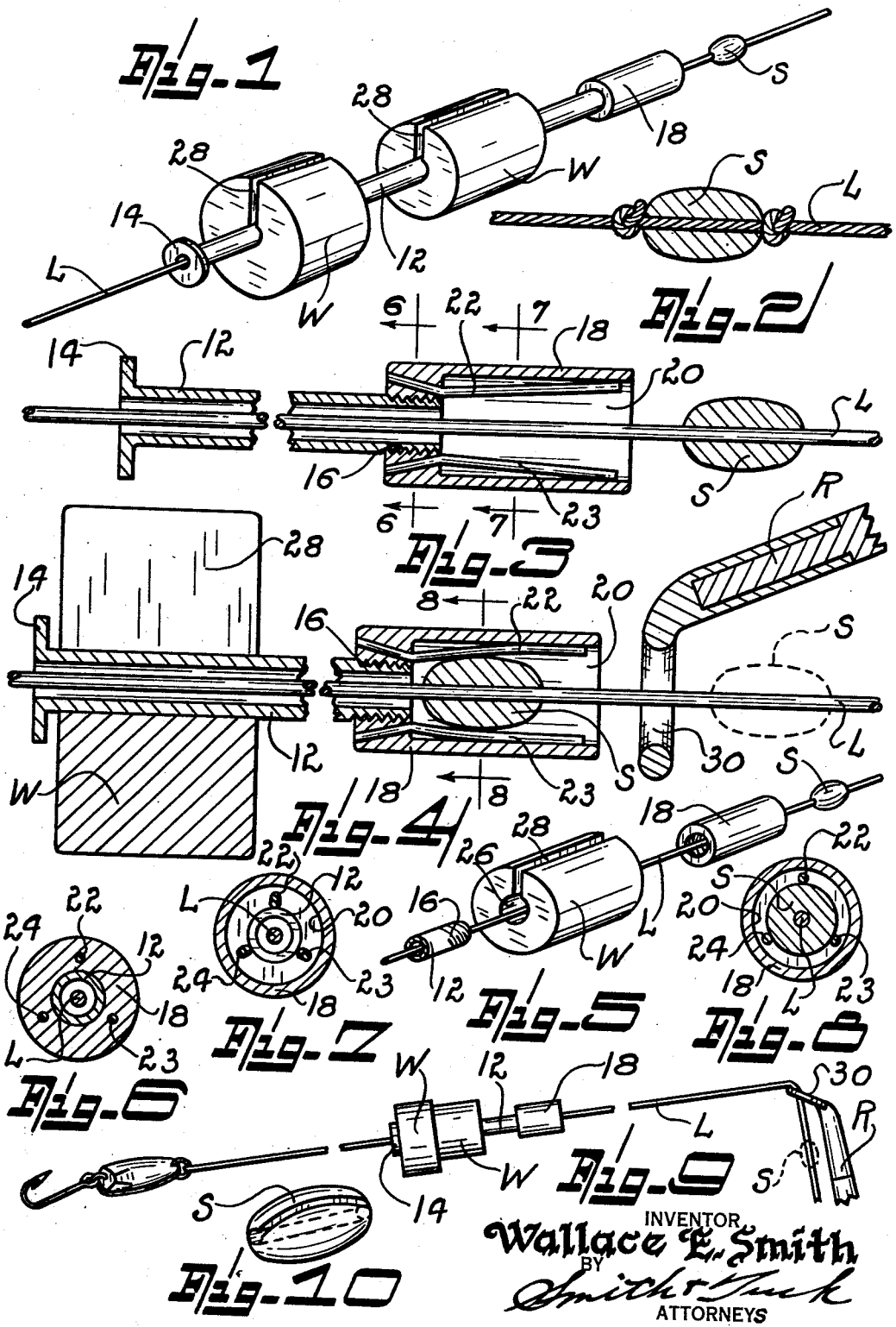

Patented Oct. 24, 1939

2,177,007

UNITED STATES PATENT OFFICE 2,177,007

RELEASABLE SINKER HAVING WEIGHT CHANGING MEANS

Wallace E. Smith, Seattle, Wash.

Application July 8, 1938, Serial No. 218,196

6 Claims. (Cl. 43—52)

This present invention is intended to provide means for releasing the weight or sinker when the fishing line is being reeled in, so that the sinker can slide down the line until it encounters the lure. This enables a fisherman to play his fish against the spring of the pole, and to use his reel in its normally intended manner, while bringing the fish along side of the boat.

A further purpose of my present invention is to provide convenient means for quickly changing the amount of weight carried on the line so that it may quickly be adjusted for different depths of fishing, or speeds of trolling and, particularly, it is intended for use when relatively large weights are used and especially when the weights are used with wire lines although it is believed it will be apparent that the same may be used with the normal fibre line such as cuttyhunk, for instance.

Another object of this present invention is to provide frictional engaging means for holding a sinker and its carrier in position upon a line so that it may be released when the line is reeled in.

Other and more specific objects will be apparent from the following description taken in connection with the accompanying drawing, wherein Figure 1 is a perspective view of a short piece of trolling line showing my weight carrier with a plurality of weights disposed thereon.

Figure 2 illustrates the manner of securing my stop member on a fibre line, the stop member itself being shown in section.

Figure 3 is a sectional view, broken in its center to permit enlarging the principal parts thereof, showing the carrier used after the teachings of my present invention together with the stop as used on a metal line or wire.

Figure 4 is a sectional view similar to Figure 3, excepting the line stop is shown as being frictionally disposed within the weight carrier and a weight is shown in place on the carrier.

Figure 5 is a perspective view showing a fragment only of the weight carrier and illustrating the manner in which a weight is secured on said carrier without the necessity of parting the line.

Figure 6 is a cross-sectional view taken along the line 6—6 of Figure 3.

Figure 7 is a cross-sectional view taken along the line 7—7 of Figure 3.

Figure 8 is a cross-sectional view taken along the line 8—8 of Figure 4.

Figure 9 is a view showing a fishing weight assembly with the tip of the fishing pole and lure used therewith.

Figure 10 illustrates, in perspective, one form of weight that may be used with my fishing weight carrier.

Referring to the drawing, throughout which like reference characters indicate like parts, 12 designates the carrier tube of my device which is formed normally of tubing of a diameter to easily pass the line L through its bore. At the lure end of the carrier a flange 14 is provided and at its front end the carrier tube is threaded as at 16 so as to accommodate the frictional locking device 18. This member is adapted to engage the end of tube 12 as by the threads shown at 16 and is provided with a recessed cavity 20 of sufficient diameter so as to form an engaging housing for the line stop S. Secured within member 18 after the showing of Figures 3, 4, 6, 7, and 8, are a plurality of spring tension members 22, 23, and 24. These members are fixedly secured in the threaded end of member 18 and are disposed so as to form a conical gripping jaw for stop member S after the showings of Figures 3 and 4.

Stop member S may be secured in a number of ways on a metal line or wire line. It may be threaded on and then squeezed tight after the order of split sinkers; or it may have merely a hole through it and be sweated or swedged to the line. When the stop is used on fibre line as, for instance, cuttyhunk, the line may be knotted on each end of the stop as is illustrated in Figure 2.

Tube 12 is adapted to receive weights of various sizes or a plurality of the same so that any given aggregate within the limit of the design may be applied thereto. Inasmuch as it is desirable with such a device to be able to quickly add to the weight on the carrier or to take weight off, I provide the weight W with a cylindrical bore as 26, of a size to readily slip over tube 12 so as to permit its attachment to the line without cutting the same; to accomplish this I provide a slot as 28 extending radially through the wall of the sinker after the showing of Figures 1, 4, and 5, so that when the friction locking device 18 is unscrewed from tube 12 after the showing of Figure 5, the weight may be slipped over the line and then slid lengthwise onto tube 12. When the desired amount of weight has been added to carrier 12 the keeper 18 is then screwed back into engagement with threads 16.

Stop S is secured to the line at such a point that the distance from stop S to the lure may be 20 feet or more. This prevents the eddy currents around the sinker from disturbing the action of the lure and also prevents the fish, that might otherwise strike the lure, from being frightened by the passage of the weight through the water. It is to be understood that with such types of fishing a leader might be part of the line joining the lure and stop S.

In using the sinker arrangement of the present invention, the line is paid out until stop S is within easy reach and then the fishing weight or carrier is grasped and, by pulling on the lure end of the line, stop S is seated in the jaws, formed by the spring wire members 22, 23, and 24, sufficiently tight so that the friction of the weights in the water will not dislodge their engagement.

When a fish strikes, the fisherman reels in his line in the usual manner and when the friction locking member 18 engages tip 30 of rod R, stop S is pulled out of the friction engagement that has held the weight carrier in its normal position on the line and, as the stop is small enough to pass through the opening in tip 30, it may be wound up on the reel with the line. This allows the carrier and its supported weight to slide down the line to the lure, thus permitting the fisherman to play his fish against the spring of his pole and to use his reel as it is intended to be used.

The foregoing description and the accompanying drawing are believed to clearly disclose a preferred embodiment of this invention but it will be understood that this disclosure is merely illustrative and that such changes in the invention may be made as are fairly within the scope and spirit of the following claims:

Having thus fully described my invention, what I claim as new and desire to secure by Letters Patent is:

1. In a slip-sinker for a fishing line having a stop on the line, the combination with a tubular carrier mounted on the line between said stop and the free end of the line, a sinker mounted on the carrier, and means on the carrier releasable under a pull on the line for frictionally-locking engagement with the stop.

2. In a slip-sinker for a fishing line having a stop on the line, the combination with a tubular carrier mounted on the line between said stop and the free end of the line, and a stop flange on one end of the carrier, of a longitudinally movable sinker mounted on one end of the carrier, and means on the other end of the carrier releasable under a pull on the line for frictional locking engagement with the stop.

3. In a slip-sinker for a fishing line having a stop on the line, the combination with a tubular carrier mounted on the line beyond the stop, and means on the carrier releasable under a pull on the line for frictional locking engagement with the stop.

4. In a slip sinker for a fishing line having a stop on the line, the combination with a tubular carrier mounted on the line beyond the stop, an end-housing on the carrier, and frictional devices within said carrier for locking engagement with the stop whereby the carrier is releasable under a pull on the line.

5. In a slip-sinker for a fishing line having a fixed stop thereon, the combination with a tubular carrier and a sinker mounted thereon, of a housing and detachable means for fastening the housing on the carrier, and a plurality of spring pins mounted in the housing for frictional engagement with said stop, whereby the carrier may be released by a pull on the line.

6. In a slip-sinker for a fishing line having a fixed stop thereon, the combination with a tubular carrier mounted on the line beyond the stop and having a stop flange at its far end, of a longitudinally movable sinker mounted on the far end of the carrier, a cylindrical housing threaded on the near end of the carrier, and obliquely extending spring-pins mounted in said housing for frictional locking engagement with said stop.

WALLACE E. SMITH.